US007505791B2

(12) United States Patent
Yamamoto

(10) Patent No.: US 7,505,791 B2
(45) Date of Patent: Mar. 17, 2009

(54) ANTENNA SETTING APPARATUS

(75) Inventor: Naoki Yamamoto, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 482 days.

(21) Appl. No.: 11/347,043

(22) Filed: Feb. 3, 2006

(65) Prior Publication Data

US 2006/0234653 A1 Oct. 19, 2006

(30) Foreign Application Priority Data

Feb. 3, 2005 (JP) ............................ 2005-027964

(51) Int. Cl.
*H04M 1/00* (2006.01)

(52) U.S. Cl. .............. 455/562.1; 455/188.2; 455/180.1; 342/368; 342/428

(58) Field of Classification Search ................. 455/121, 455/456.5, 456.6, 561, 424, 425, 503, 63.4, 455/562.1, 575.7, 179.1, 180.1, 193.1, 188.2, 455/226.3, 226.4, 3.02, 125, 161.1, 162.1, 455/161.3, 185.18; 348/725, 731, 21, 570, 348/732, 733, 674, 685, 555, 727, 507, 14.1, 348/735, 116, 729, 554, 706; 342/359, 703, 342/77, 368, 428; 343/763, 766

See application file for complete search history.

(56) References Cited

U.S. PATENT DOCUMENTS 4,855,833 A * 8/1989 Kageyama et al. .......... 348/588
5,067,017 A * 11/1991 Zucker .................. 375/240.01
5,300,935 A * 4/1994 Yu ............................ 342/359
5,561,433 A * 10/1996 Chaney et al. .............. 342/359
5,940,028 A * 8/1999 Iwamura .................... 342/359
6,229,480 B1 * 5/2001 Shintani .................... 342/359

(Continued)

FOREIGN PATENT DOCUMENTS

JP 05-328244 12/1993

(Continued)

OTHER PUBLICATIONS

Patent Abstracts of Japan, Application No. 2004-112573, dated Apr. 8, 2004 (1 page).

(Continued)

*Primary Examiner*—Duc Nguyen
*Assistant Examiner*—Charles Chow
(74) *Attorney, Agent, or Firm*—Osha - Liang LLP

(57) ABSTRACT

An antenna setting apparatus that allows a user to receive a broadcast from a desired direction easily and excellently is configured as follows: an antenna setting apparatus includes: a control unit changing the direction of a smart antenna with high sensitivity; a tuner extracting a signal; a CPU controlling the control unit, controlling the frequency of the signal extracted by the tuner and controlling the control unit to change the direction with high sensitivity; an OSD outputting an information set represented by the signal; a remote control reception unit accepting a selection; a first area of a memory storing an information set, where the information set is stored in association with the direction of the smart antenna and the frequency of the signal; and a second area of the memory storing the direction and the frequency corresponding to the information set designated by the selection.

6 Claims, 4 Drawing Sheets

U.S. PATENT DOCUMENTS

| | | | | |
|---|---|---|---|---|
| 6,509,934 | B1 * | 1/2003 | Bao et al. | 348/570 |
| 6,661,373 | B1 * | 12/2003 | Holliday | 342/359 |
| 6,697,610 | B1 * | 2/2004 | Tait | 455/277.1 |
| 7,136,113 | B2 * | 11/2006 | Lee | 348/725 |
| 7,286,190 | B2 * | 10/2007 | Klopfenstein et al. | 348/569 |
| 2002/0106042 | A1 * | 8/2002 | Yu et al. | 375/347 |
| 2005/0009586 | A1 * | 1/2005 | Mori | 455/575.7 |
| 2006/0003690 | A1 * | 1/2006 | Onomatsu et al. | 455/3.02 |
| 2006/0020996 | A1 * | 1/2006 | Takagi et al. | 725/124 |
| 2007/0096994 | A1 * | 5/2007 | Kuroyanagi et al. | 343/702 |
| 2007/0225052 | A1 * | 9/2007 | Yamazaki et al. | 455/575.7 |
| 2007/0247374 | A1 * | 10/2007 | Nishikido et al. | 343/702 |

FOREIGN PATENT DOCUMENTS

| | | |
|---|---|---|
| JP | 2004-112573 | 4/2004 |
| JP | 2004-260308 | 9/2004 |

OTHER PUBLICATIONS

Patent Abstracts of Japan, Application No. 05-328244, dated Dec. 10, 1993 (1 page).

Patent Abstracts of Japan, Application No. 2004-260308, dated Sep. 16, 2004 (1 page).

* cited by examiner

| | | |
|---|---|---|
| RECEPTION DIRECTION (5) VIDEO | RECEPTION DIRECTION (6) VIDEO | RECEPTION DIRECTION (7) VIDEO |
| RECEPTION DIRECTION (8) VIDEO | RECEPTION DIRECTION (9) VIDEO | RECEPTION DIRECTION (10) VIDEO |

ANTENNA SETTING APPARATUS

BACKGROUND OF THE INVENTION

1. Field of the Invention

The present invention relates to an antenna setting apparatus, particularly to an antenna setting apparatus at a receiving station.

2. Description of the Background Art

Japanese Patent Laying-Open No. 2004-260308 discloses a channel selection apparatus in which a plurality of tuners are controlled based on reset information stored in a storage circuit to select a desired channel, including: a determination signal output circuit provided for each tuner, the determination signal output circuit outputting a determination signal indicating whether the channel selected by the tuner is a used channel or an unused channel; and a control circuit that uses the plurality of tuners simultaneously to sequentially set a selected channel so that no channel is assigned to more than one tuner and produces reset information using a determination signal for a set channel and a tuner setting information for selecting a channel indicated by the determination signal to be a used channel.

The above invention can decrease the time required for auto presetting using a plurality of tuners simultaneously.

Japanese Patent Laying-Open No. 05-328244 discloses a channel selection apparatus for a television set characterized in that a channel is selected for the television set by scaling down videos from a plurality of stations and displaying them simultaneously on one screen that is divided into sub-screens, and displaying a cursor on the screen which can be moved to select the station of a video pointed to by a cursor.

This invention allows video contents from multiple stations can be viewed simultaneously, facilitating channel selection.

Japanese Patent Laying-Open No. 2004-112573 discloses an adaptive array radio communication apparatus with a plurality of antennas including: a determination circuit determining the reception level of a plurality of sequences of signals received by the respective antennas; a display device displaying the reception level of the sequences of signals for which determination has been made; and a reception level adjustment device for adjusting the reception level of the sequences of signals based on manual operation by a user. This invention allows a user to easily adjust the antenna reception level even in an adaptive array radio communication apparatus with a plurality of antennas.

Unfortunately, the inventions disclosed in Japanese Patent Laying-Open Nos. 2004-260308, 05-328244 and 2004-112573 may have difficulty receiving a user's desired broadcasts. For example, Advanced Television Systems Committee (ATSC) digital broadcasting and National Television Standards Committee (NTSC) analog broadcasting are provided in North America. Broadcast stations for such broadcasting are distributed across the United States. A conventional antenna (Yagi antenna, for example) can only receive broadcasts from those of the broadcast stations that are located in a particular direction. FIG. 5 is a schematic view illustrating this problem. For example, when the antenna of a user's home 70 may be oriented to area A, only broadcasts from area A can be received at user's home 70. Broadcasts from areas B and C cannot be received.

The smart antenna was developed to solve this problem. A smart antenna allows the direction to receive a broadcast to be arbitrarily set. A smart antenna allows a user to receive broadcasts from any direction. Unfortunately, a smart antenna is very difficult for the user to adjust (particularly to provide excellent image quality). FIG. 6 is a schematic view illustrating how this problem occurs. Typically, the direction of a smart antenna to receive an electric wave is set to the direction providing the highest intensity of a received signal (such setting itself is difficult for a user without specialist knowledge). However, a wave from broadcast station 72 reflected by a building 74, for example, may provide a higher intensity than that by a wave directly received from the station. In such a situation, the received image may not be optimal if the direction of a smart antenna to receive an electric wave is set to the direction providing the highest intensity of a signal. The necessity of taking that into consideration is one of the reasons why it is so difficult for the user to adjust the smart antenna. Due to this and other problems, antenna manufacturers considered the adjustment of the direction to receive a broadcast as outside the scope of user operation. Still, it is a great nuisance for the user to ask a specialist to adjust their antenna each time a path for receiving electric waves is changed (for example, a new broadcast station is established or an old one is decommnissioned, or a new building appears). This problem does not depend on whether analog or digital broadcasting is concerned because, for analog broadcasting, the image quality is dependent on the quality of an electric wave received and, for digital broadcasting, block noise may prevent a received signal from being decoded by the decoder.

SUMMARY OF THE INVENTION

The present invention solves the above problems. An object of the present invention is to provide an antenna setting apparatus that allows a user to receive a broadcast from a desired direction easily and excellently.

To achieve the above object, according to an aspect of the present invention, an antenna setting apparatus includes: a changing device for changing a direction of a smart antenna with high sensitivity; a first control unit for controlling the changing device to provide high sensitivity for a predetermined direction; a tuner extracting a signal corresponding to an electric wave received by the smart antenna; a second control unit for controlling a frequency of the signal extracted by the tuner; a first storage device for storing an image information set represented by the signal extracted by the tuner, the image information set being stored in association with the direction of the smart antenna with high sensitivity and the frequency of the signal extracted by the tuner; an output device for outputting the image information set represented by the signal extracted by the tuner, two or more image information sets with an identical corresponding frequency and different corresponding directions being output at a time; an accepting unit for accepting a selection of one of the two or more image information sets output by the output device; a second storage device for storing the direction and the frequency corresponding to the image information set designated by the selection, the direction and the frequency being stored in association with each other; and a third control unit for controlling the changing device to change the direction with high sensitivity to that of directions stored by the second storage device that corresponds to the frequency of the signal extracted by the tuner.

That is, the first control unit controls the changing device to provide high sensitivity for a predetermined direction. The tuner extracts a signal corresponding to an electric wave received by the smart antenna. The output device outputs an image information set represented by the signal extracted by the tuner, where two or more image information sets with an identical corresponding frequency and different corresponding directions are output at a time. The accepting unit accepts a selection of one of the two or more image information sets output by the output device. Consequently, a user can select a direction of the antenna with high sensitivity based on output image information. The second storage device stores the direction and the frequency corresponding to the image information set designated by the selection, where the direction and the frequency are stored in association with each other. The third control unit controls the changing device to change the direction with high sensitivity to that of directions stored by the second storage device that corresponds to the frequency of the signal extracted by the tuner. The changing device changes the direction of the smart antenna with high sensitivity. As a result, an antenna setting apparatus can be provided that allows a user to receive a broadcast from a desired direction easily and excellently.

According to another aspect of the present invention, an antenna setting apparatus includes: a changing device for changing a direction of an antenna with high sensitivity, the antenna being capable of changing the direction with high sensitivity; a first control unit for controlling the changing device to provide high sensitivity for a predetermined direction; an extraction device for extracting a signal corresponding to an electric wave received by the antenna; a second control unit for controlling a frequency of the signal extracted by the extraction device; a first storage device for storing an information set represented by the signal extracted by the extraction device, the information set being stored in association with the direction of the antenna with high sensitivity and the frequency of the signal extracted by the extraction device; an output device for outputting the information set represented by the signal extracted by the extraction device; an accepting unit for accepting a selection of one of information sets output by the output device; a second storage device for storing the direction and the frequency corresponding to the information set designated by the selection, the direction and the frequency being stored in association with each other; and a third control unit for controlling the changing device to change the direction with high sensitivity to that of directions stored by the second storage device that corresponds to the frequency of the signal extracted by the extraction device.

That is, the first control unit controls the changing device to provide high sensitivity for a predetermined direction. The extraction device extracts a signal corresponding to an electric wave received by the antenna. The output device outputs an information set represented by the signal extracted by the extraction device. The accepting unit accepts a selection of one of information sets output by the output device. Consequently, a user can select a direction of the antenna with high sensitivity based on output information. The second storage device stores the direction and the frequency corresponding to the information set designated by the selection, where the direction and the frequency are stored in association with each other. The third control unit controls the changing device to change the direction with high sensitivity to that of directions stored by the second storage device that corresponds to the frequency of the signal extracted by the extraction device. The changing device changes the direction of an antenna with high frequency, the antenna being capable of changing the direction with high sensitivity. As a result, an antenna setting apparatus can be provided that allows a user to receive a broadcast from a desired direction easily and excellently.

It is desirable that the above output device includes a device for outputting the information set represented by the signal extracted by the extraction device, a plurality of information sets with an identical corresponding frequency being output at a time. It is desirable that the accepting unit includes a unit for accepting a selection of one of the plurality of information sets.

That is, the output device outputs the information set represented by the signal extracted by the extraction device, where a plurality of information sets with an identical corresponding frequency are output at a time. The accepting unit accepts a selection of one of the plurality of information sets output by the output device. Consequently, a user can select a direction with high sensitivity more easily based on output information.

As a result, an antenna setting apparatus can be provided that allows a user to receive a broadcast from a desired direction more easily and excellently.

It is desirable that the above plurality of information sets include two or more information sets with different corresponding directions.

That is, the output device outputs the information set represented by the signal extracted by the extraction device, where two or more information sets with an identical corresponding frequency and different corresponding directions are output at a time.

The accepting unit accepts a selection of one of the two or more information sets output by the output device. Consequently, a user can select a direction with high sensitivity more easily based on output information. As a result, an antenna setting apparatus can be provided that allows a user to receive a broadcast from a desired direction more easily and excellently.

It is desirable that the above plurality of information sets include image information.

That is, the output device outputs the image information set represented by the signal extracted by the extraction device, where a plurality of information sets with an identical corresponding frequency are output at a time. The accepting unit accepts a selection of one of the plurality of image information sets output by the output device. Consequently, a user can select a direction with high sensitivity more excellently based on output information. As a result, an antenna setting apparatus can be provided that allows a user to receive a broadcast from a desired direction more easily and more excellently.

It is desirable that the above antenna setting apparatus further includes a detection unit for detecting vertical synchronization for the signal corresponding to the electric wave. It is desirable that the first storage device includes a device for storing an information set represented by that of signals extracted by the extraction device for which the detection unit has detected vertical synchronization. It is desirable that the output device includes a device for outputting the information set represented by that of the signals extracted by the extraction device for which the detection unit has detected vertical synchronization.

That is, the detection unit detects vertical synchronization for the signal corresponding to the electric wave. The first storage device stores an information set represented by that of signals extracted by the extraction device for which the detection unit has detected vertical synchronization. The output device outputs the information set represented by that of the signals extracted by the extraction device for which the detection unit has detected vertical synchronization. Consequently, a user can select a direction with high sensitivity more excellently based on output information. As a result, an antenna setting apparatus can be provided that allows a user to receive a broadcast from a desired direction more easily and more excellently.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
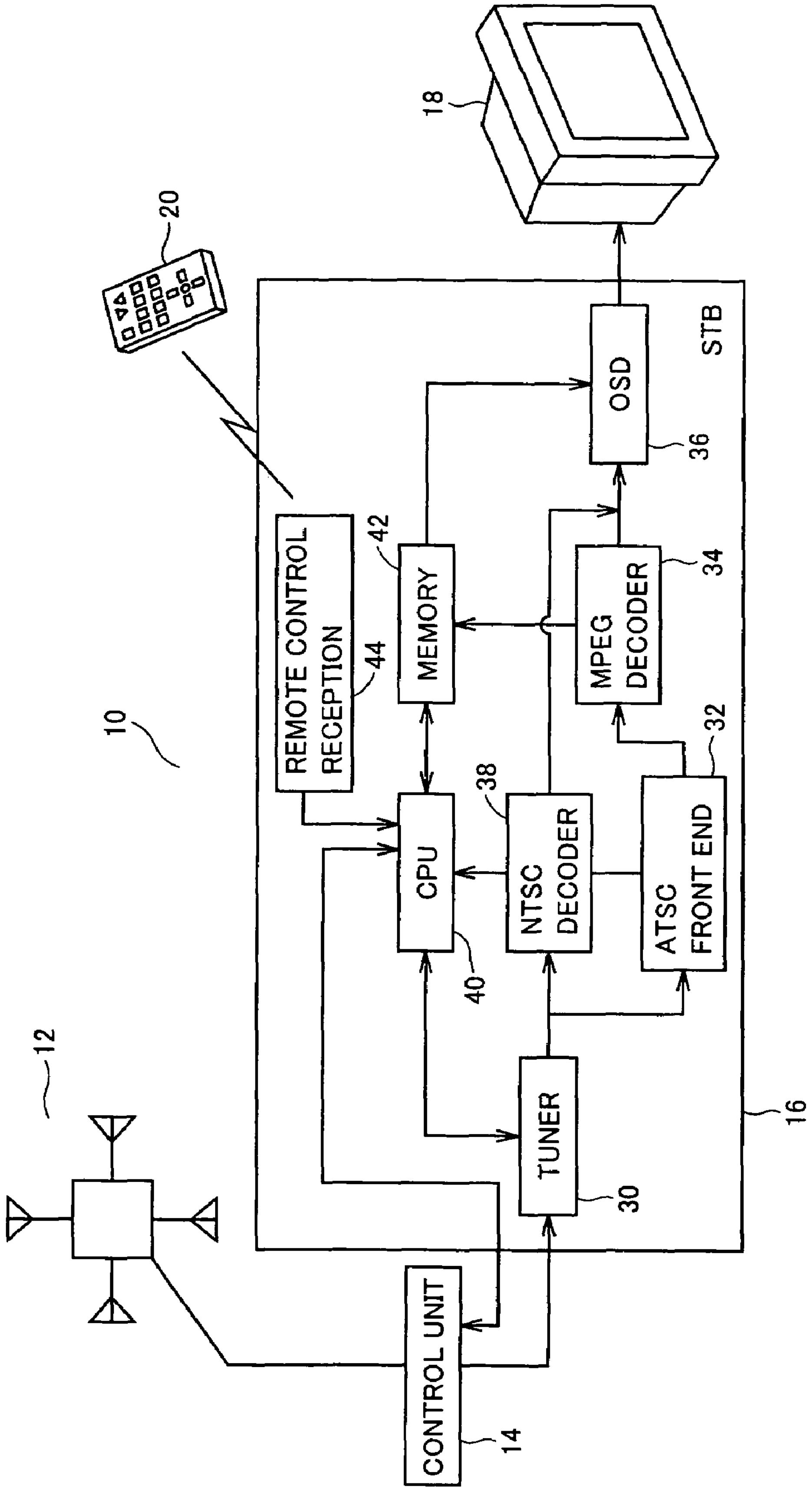
FIG. 1 is a structural overview of a reception system according to an embodiment of the present invention.

An embodiment of the present invention will now be described referring to the drawings. In the following description, like components are designated by like characters and thus have the same names and functions. Accordingly, they will not be described in detail more than once.

Referring to FIG. 1, a reception system 10 according to the present embodiment includes a smart antenna 12, a control unit 14, a setting apparatus 16, a TV 18, and a remote control 20. Smart antenna 12 converts an electric wave received by four antennas into an electric current. Control unit 14 provides control of the direction of smart antenna 12 in which it can receive a broadcast with optimal sensitivity. Control unit 14 also changes the direction of smart antenna 12 with high sensitivity. In the present embodiment, control unit 14 modifies the electric field intensity which four antennas of smart antenna 12 detect, thereby causing a change among 16 directions of smart antenna 12 with high sensitivity. Thus, smart antenna 12 can excellently receive a broadcast from 16 directions. Setting apparatus 16 sets a direction of smart antenna 12 to receive a broadcast for each broadcast station. Setting apparatus 16 also outputs the wave received by smart antenna 12 to TV 18 in the form of a signal. TV 18 converts the signal from setting apparatus 16 into a video. Remote control 20 accepts an instruction by a user to setting apparatus 16. Remote control 20 also transmits the accepted instruction to setting apparatus 16.

Setting apparatus 16 includes a tuner 30, an ATSC front end 32, a Moving Picture Experts Group (MPEG) decoder 34, an On Screen Display (OSD) 36, an NTSC decoder 38, a central processing unit (CPU) 40, a memory 42, and a remote control reception unit 44. Tuner 30 extracts a signal representing video or audio from an electric current from control unit 14 (smart antenna 12 converted an electric wave into this current). ATSC front end 32 converts a signal from tuner 30 into an MPEG signal. MPEG decoder 34 decodes a signal from ATSC front end 32 into a video or audio signal, for example. OSD 36 converts the video or audio signal, for example, into a signal that can be used by TV 18. NTSC decoder 38 decodes the signal from tuner 30 into a video or audio signal. CPU 40 controls various units in setting apparatus 16. This control includes the control of the frequency of a signal extracted by tuner 30. Memory 42 stores information required by the CPU to control various units in setting apparatus 16 and information required for determining the direction of smart antenna 12 to receive a broadcast. Remote control accepting unit 44 converts a signal transmitted by remote control 20 into a signal that can be used by CPU 40.

Memory 42 includes a first area and a second area. The first area stores an image information set (image information represented by the signal extracted by turner 30), where the image information set is stored in association with the direction of smart antenna 12 with high sensitivity and the frequency of the signal extracted by tuner 30. The second area stores the direction and the frequency corresponding to an image information set (the image information set designated by a selection accepted by remote control reception unit 44), where the direction and the frequency are stored in association with each other.

Figure 2:
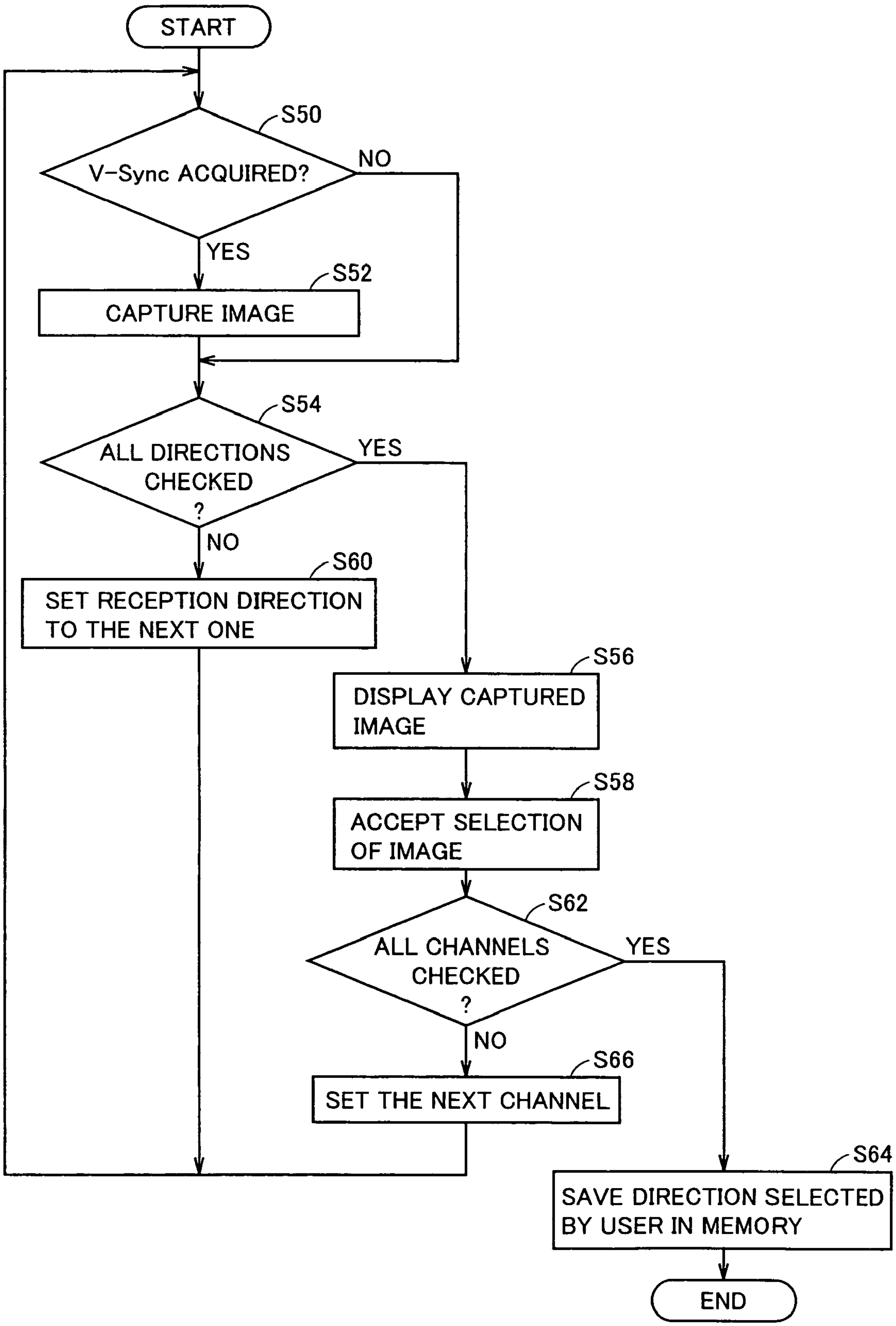
FIG. 2 is a flow chart showing a control procedure for setting a direction for reception according to an embodiment of the present invention.

Referring to FIG. 2, a program executed by the reception system according to the present embodiment has the following control structure concerning the setting of the direction for reception.

At step 50 (the steps are hereinafter referred to as "S"), smart antenna 12 receives an electric wave. Upon the reception of the wave, control unit 14 outputs an electric current from smart antenna 12 to tuner 30. Upon the output of the current, tuner 30 receives the wave (or a signal corresponding to the wave) in the form of a current provided by smart antenna 12 via control unit 14. Tuner 30 extracts a signal corresponding to the wave from the received current. Upon the extraction of the signal, CPU 40 analyzes the variation of the value of the signal in order to detect vertical synchronization for the signal corresponding to the wave. When the analysis is completed, CPU 40 determines if the signal from tuner 30 indicates V-Sync (whether V-Sync is acquired) based on the analyzed variation of the value of the signal. V-Sync is acquired because it may allow the most objective decision as to whether there is a signal or not. If it is determined that V-Sync is acquired (YES at S50), the process proceeds to S52. Otherwise (NO at S50), the process proceeds to S54.

At S52, if the electric wave received by smart antenna 12 is an analog signal, NTSC decoder 38 decodes the signal from tuner 30 into a video or audio signal. If the wave received by smart antenna 12 is a digital signal, ATSC front end 32 and MPEG decoder 34 decodes the signal from tuner 30 into a video or audio signal. Upon the decoding of the audio or video signal, CPU 40 stores the signal in the first area of memory 42 where the signal is stored in association with the direction of smart antenna 12 with high sensitivity and the frequency of the signal extracted by tuner 30. Thus, CPU 40 captures a decoded image, for example.

At S54, CPU 40 determines whether smart antenna 12 has checked if V-Sync was acquired for all the directions. If so (YES at S54), the process proceeds to S56. Otherwise (NO at S54), the process proceeds to S60.

At S56, CPU 40 reads information of a captured image, for example, from the first area of memory 42. CPU 40 outputs the read image information, for example, to OSD 36. OSD 36 converts the output image information, for example, into a signal that can be output by TV 18. In the present embodiment, OSD 36 converts the image information output (i.e. represented by the signal extracted by tuner 30), where two or more image information sets with an identical corresponding frequency and different corresponding directions are converted at a time. At this time, the image information, for example, is converted such that the layout for display on TV 18 is modified in accordance with the number of the captured images. OSD 36 outputs the converted signal to TV 18. TV 18 displays the signal from OSD.36 in the form of a video, for example. At S58, remote control reception unit 44 accepts a selection of an image from a user via remote control 20.

At S60, CPU 40 outputs a signal to change the direction of smart antenna 12 to receive a broadcast. When control unit 14 receives a signal from CPU 40, it changes the direction of smart antenna 12 to receive a broadcast.

At S62, CPU 40 determines if image selection has been received for all the broadcast stations in question. If so (YES at S62), the process proceeds to S64. Otherwise (NO at S62), the process proceeds to S66.

At S64, CPU 40 stores, in the second area of memory 42, the direction and channel corresponding to the selection by the user accepted by remote control reception unit 44 (i.e. the direction and frequency corresponding-to the image information; "image information" means the image information set designated by the selection accepted by remote control reception unit 44 and output by OSD 36), where the direction and channel are stored in association with each other.

At S66, CPU 40 outputs to tuner 30 a signal to change stations for reception. Upon the output of the signal, tuner 30 extracts a signal from the station designated by the signal from that on.

Operations of reception system 10 based on the configuration and flow chart as above will be described.

When the user transmits a signal to set a direction for reception of a broadcast to setting apparatus 16 via remote control 20, remote control reception unit 44 accepts the signal. When the signal is accepted, CPU 40 outputs to control unit 14 a signal to receive a broadcast. Thus, control unit 14 is controlled to provide high sensitivity for a predetermined direction (in the present embodiment, this direction is predetermined by the designer of setting apparatus 16; in the present embodiment, the "predetermined direction" is iteratively re-set while S50 to S60 are repeated). The control unit 14 changes the direction of smart antenna 12 with high sensitivity to receive a broadcast from the direction represented by the signal. Upon the output of the signal to receive a broadcast, CPU 40 controls the frequency of a signal extracted by tuner 30 by outputting a signal. Smart antenna 12 receives a broadcast. Upon the reception of the broadcast, tuner 30 extracts a signal corresponding to an electric wave received by smart antenna 12. CPU 40 accepts a signal from tuner 30. When the signal is accepted, CPU 40 analyzes the variation of the value of the signal in order to detect vertical synchronization for the signal corresponding to the wave. When the analysis is completed, CPU 40 determines whether V-Sync is acquired (S50). If it is determined that V-Sync is acquired (YES at S50), CPU 40 captures an image, for example, decoded by NTSC decoder 38, for example (S52). Thus, the first area of memory 42 stores an image information set for which CPU 40 has detected vertical synchronization and which is represented by the signal extracted by tuner 30 (the signal corresponding to the wave), where the information set is stored in association with the direction of smart antenna 12 with high sensitivity and the frequency of the signal extracted by tuner 30.

When the image, for example, is captured, CPU 40 determines if the acquisition of V-Sync for all the directions has been checked (S54). If not so (NO at S54), CPU 40 outputs to control unit 14 a signal to change the direction for receiving a broadcast (S60).

Figures 3, 4:
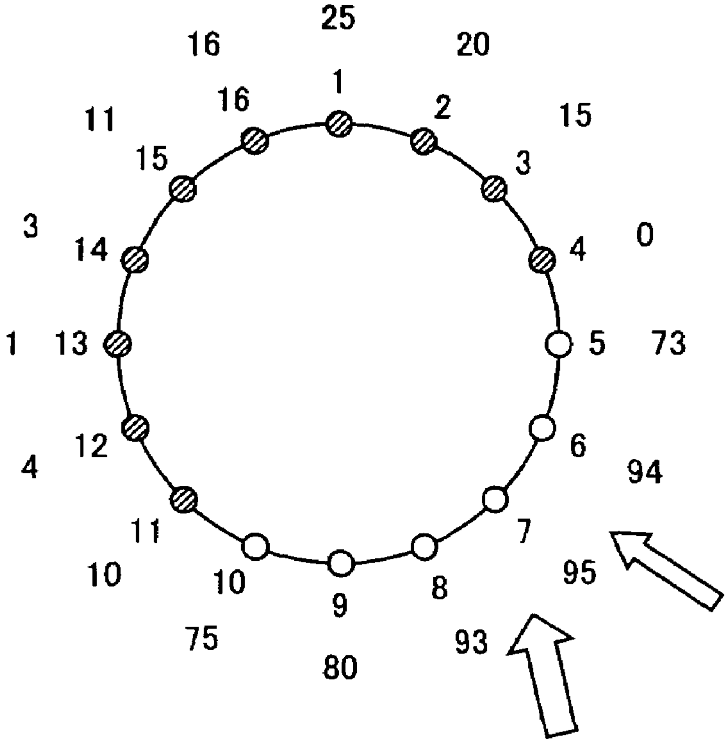
FIG. 3 illustrates a result-of the checking according to an embodiment of the present invention.
FIG. 4 is a schematic view of a list of images displayed on the TV according to an embodiment of the present invention.
Figure 5:
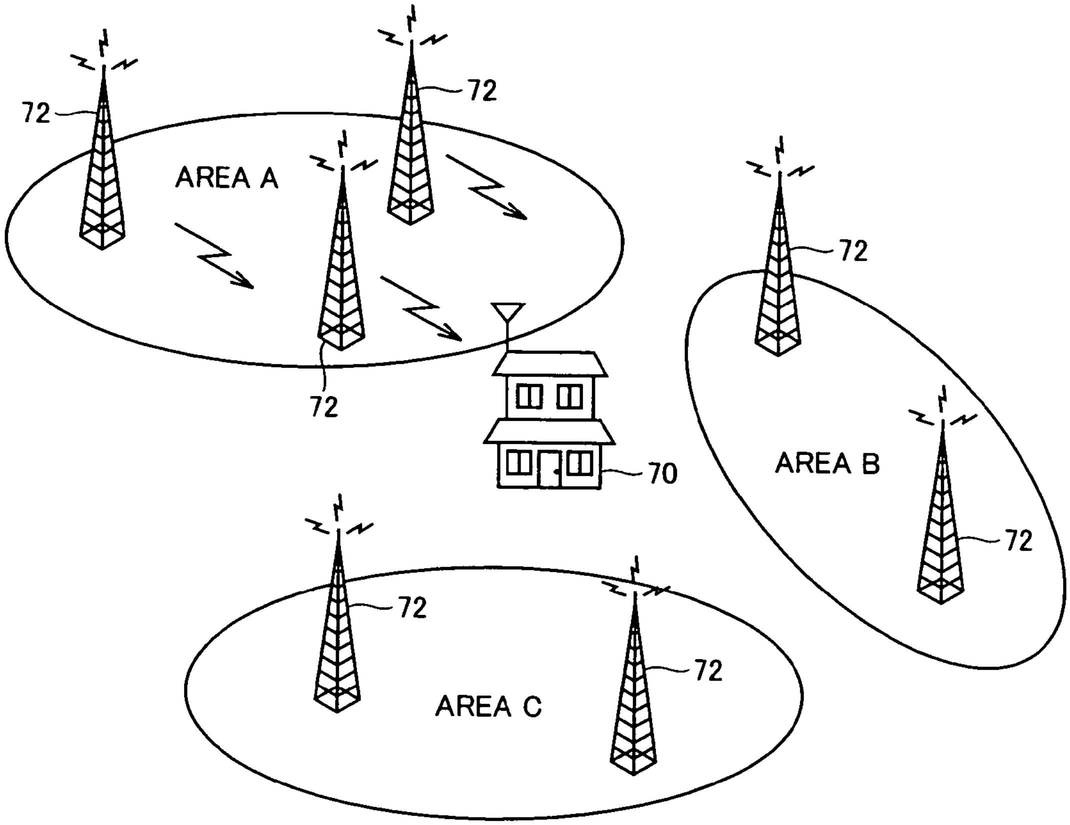
FIG. 5 is a schematic view illustrating a problem according to the conventional art.
Figure 6:
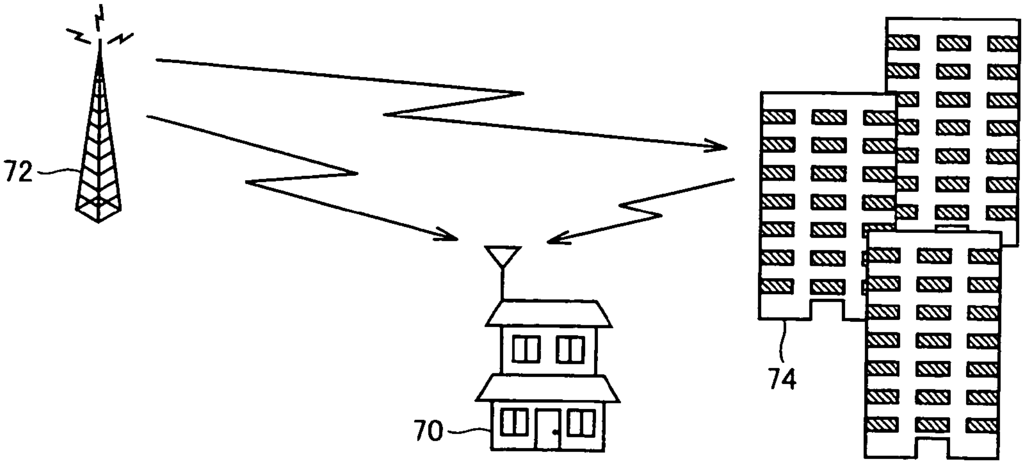
FIG. 6 is a schematic view illustrating how a problem arises to a smart antenna according to the conventional art.

When the signal is output, S50 to S60 are repeated. Ultimately, the acquisition of V-Sync is checked for all the directions. FIG. 3 illustrates a result of the checking for one particular channel. In FIG. 3, the thicker arrow points to smart antenna 12 from a broadcast station. The thinner arrow indicates the direction in which a wave reflected by a building, for example, moves. Of the numbers arranged concentrically, the numbers in the interior (hereinafter referred to as "inner numbers") each labels a direction. The outer numbers from the concentric numbers indicate the strength of an electric wave received. An unhatched circle indicates that V-Sync was acquired. A hatched circle indicates that V-Sync was not acquired. In FIG. 3, V-Sync was acquired for the directions with the inner numbers "5" to "10".

After that, since it is determined that the acquisition of V-Sync is checked for all the directions (YES at S54), CPU 40 causes a captured image, for example, to be displayed on TV 18 via OSD 36 (S56). To do this, in the present embodiment, OSD 36 outputs an image information set for which CPU 40 has detected vertical synchronization and which is represented by the signal extracted by tuner 30, where two or more image information sets with an identical corresponding frequency and different corresponding directions are output at a time. FIG. 4 illustrates a list of images of the same channel displayed on TV 18 at this moment. The present embodiment supposes that the direction with the inner number "6" in FIG. 3 (the image in the area displayed as "reception direction (6) video" in FIG. 4) and the direction with "7" (the image in the area displayed as "reception direction (7) video" in FIG. 4) have low image qualities.

When the image, for example, is displayed, remote control reception unit 44 accepts a selection of one of two or more images from the user (it is also a selection of one of two or more image information sets output by OSD 36) via remote control 20 (S58). The user can view the images to select the direction with good image quality. When the selection is accepted, CPU 40 determines whether the acquisition of V-Sync is checked for all the broadcast stations (S62). Since not all the channels are checked from the beginning (NO at S62), CPU 40 outputs to tuner 30 a signal to change broadcast stations for reception (S66). When the signal is output, the processes of S50 to S66 are repeated. Since the acquisition of V-Sync is ultimately checked for all the stations (YES at S62), CPU 40 stores, in the second area of memory 42, the direction and the channel corresponding to the selection accepted by remote control reception unit 44 (i.e. the direction and the frequency corresponding to image information; "image information" means the image information set designated by the selection accepted by remote control reception unit 44 and output by OSD 36), where the direction and the channel are stored in association with each other (S64). From this on, CPU 40 controls control unit 14 to change the direction with high sensitivity to that of directions stored by the second area of memory 42 that corresponds to the frequency of the signal extracted by tuner 30. Thus, the direction of smart antenna 12 to receive an electric wave is changed to a direction stored in the second area of memory 42. This control is performed each time remote control reception unit 44 accepts a change of channels until the direction to receive a broadcast is re-set.

As above, a setting apparatus according to the present embodiment accepts a selection of a direction to receive a broadcast corresponding to a channel based on a list of images displayed on the TV. It is not necessary to automatically select the direction in which the intensity of a signal exceeds a threshold for the first time during auto scanning, for example. When the selection is accepted, the setting apparatus stores the direction corresponding to the selection in the memory. In this way, the user can set a direction to receive a broadcast easily and excellently (particularly in terms of image quality) (or in accordance with the preference of the user). In particular, the user can single-handedly set a direction to receive a broadcast (this direction is not limited to a direction in which a broadcast station is located) easily and excellently without an aid of the manufacturer during the readjustment of a direction of a smart antenna to receive a broadcast in response to the establishment of a new station or decommissioning of an old one. As a result, a setting apparatus for a smart antenna can be provided that allows a user to single-handedly receive a broadcast from a desired direction easily and excellently (and thus to view/listen to a program with good image quality or a program with an image quality corresponding to the preference of the user).

When the intensity of the signal from tuner 30 is insufficient, the frequency of the received wave may be fine tuned by automatic fine tuning circuit (AFT), not shown. This may increase the intensity of the signal.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An antenna setting apparatus comprising:

a changing device for changing a direction of a smart antenna with high sensitivity;

a first control unit for controlling said changing device to provide high sensitivity for a predetermined direction;

a tuner extracting a signal corresponding to an electric wave received by said smart antenna;

a second control unit for controlling a frequency of the signal extracted by said tuner;

a first storage device for storing an image information set represented by the signal extracted by said tuner, the image information set being stored in association with said direction of the smart antenna with high sensitivity and said frequency of the signal extracted by said tuner;

an output device for outputting the image information set represented by the signal extracted by said tuner, two or more image information sets with an identical corresponding frequency and different corresponding directions being output at a time;

an accepting unit for accepting a selection of one of the two or more image information sets output by said output device;

a second storage device for storing the direction and the frequency corresponding to the image information set designated by said selection, the direction and the frequency being stored in association with each other; and a third control unit for controlling said changing device to change said direction with high sensitivity to that of directions stored by said second storage device that corresponds to the frequency of the signal extracted by said tuner.

2. An antenna setting apparatus comprising:

a changing device for changing a direction of an antenna with high sensitivity, the antenna being capable of changing said direction with high sensitivity;

a first control unit for controlling said changing device to provide high sensitivity for a predetermined direction;

an extraction device for extracting a signal corresponding to an electric wave received by said antenna;

a second control unit for controlling a frequency of the signal extracted by said extraction device;

a first storage device for storing an information set represented by the signal extracted by said extraction device, the information set being stored in association with said direction of the antenna with high sensitivity and said frequency of the signal extracted by said extraction device;

an output device for outputting the information set represented by the signal extracted by said extraction device;

an accepting unit for accepting a selection of one of information sets output by said output device;

a second storage device for storing the direction and the frequency corresponding to the information set designated by said selection, the direction and the frequency being stored in association with each other; and a third control unit for controlling said changing device to change said direction with high sensitivity to that of directions stored by said second storage device that corresponds to said frequency of the signal extracted by said extraction devices, wherein the output device outputs a plurality of information sets with an identical corresponding frequency.

3. The antenna setting apparatus of claim 2, wherein said accepting unit includes a unit for accepting a selection of one of said plurality of information sets.

4. The antenna setting apparatus of claim 3, wherein said plurality of information sets include two or more information sets with different corresponding directions.

5. The antenna setting apparatus of claim 3, wherein said plurality of information sets include image information.

6. The antenna setting apparatus of claim 2, wherein said antenna setting apparatus further comprises a detection unit for detecting vertical synchronization for the signal corresponding to said electric wave, said first storage device includes a device for storing an information set represented by that of signals extracted by said extraction device for which said detection unit has detected vertical synchronization, and said output device includes a device for outputting said information set represented by that of the signals extracted by said extraction device for which said detection unit has detected vertical synchronization.

* * * * *